United States Patent [19]

Pastor et al.

[11] Patent Number: 5,032,374
[45] Date of Patent: Jul. 16, 1991

[54] PREPARATION OF METAL SULFIDES

[75] Inventors: Ricardo C. Pastor, Manhattan Beach; Luisa E. Gorre, Oxnard, both of Calif.

[73] Assignee: Hughes Aircraft Company, Los Angeles, Calif.

[21] Appl. No.: 370,931

[22] Filed: Jun. 23, 1989

Related U.S. Application Data

[63] Continuation of Ser. No. 111,221, Oct. 22, 1987, abandoned.

[51] Int. Cl.$^5$ .............. C01B 17/22; C01B 17/42; C09K 11/08; C09K 11/54
[52] U.S. Cl. .............. 423/561.1; 423/566.1; 423/566.3; 252/301.4 S; 252/301.6 S
[58] Field of Search .............. 423/561 R, 561 A, 230, 423/DIG. 12, 561.1, 566.1, 566.3; 156/DIG. 72; 252/301.4 S, 301.6 S

[56] References Cited

U.S. PATENT DOCUMENTS

| B 535,813 | 1/1976 | Yocom et al. | 252/301.4 S |
|---|---|---|---|
| 3,541,022 | 11/1970 | Hewes | 252/301.4 S |
| 3,704,232 | 11/1972 | Frey | 252/301.6 S |
| 3,791,844 | 2/1974 | Tecotzky | 252/301.6 S |
| 3,957,678 | 5/1976 | Dikoff et al. | 252/301.6 S |
| 3,970,582 | 7/1976 | Fan et al. | 252/301.6 S |
| 4,035,819 | 7/1977 | Nitta et al. | 252/301.6 S |
| 4,041,140 | 8/1977 | Nitta et al. | 423/561 R |
| 4,272,397 | 6/1981 | Fukuda et al. | 423/561 B |
| 4,298,584 | 11/1981 | Makarides | 423/561 R |
| 4,374,037 | 2/1983 | Takahashi | 252/301.4 S |
| 4,556,547 | 12/1985 | Nisniwo et al. | 423/230 |
| 4,623,426 | 11/1986 | Peters | 156/DIG. 72 |
| 4,695,443 | 9/1987 | Leon | 423/561 R |

FOREIGN PATENT DOCUMENTS

| 94845 | 10/1895 | Fed. Rep. of Germany | 423/561 R |
|---|---|---|---|
| 1047 | of 1879 | United Kingdom | 423/561 B |

Primary Examiner—Gary P. Straub
Attorney, Agent, or Firm—Paul M. Coble; W. K. Denson-Low

[57] ABSTRACT

Metal sulfides are prepared by reacting a compound of the metal and an oxygen-containing anion, with a source of carbonyl sulfide. The resulting metal sulfide is not contaminated by hydrogen, as in the form of hydroxides, and is suitable for use in photoluminescence and electroluminescence applications. The starting material is preferably a metal oxalate, which may be appropriately doped, and the source of the carbonyl sulfide is preferably a mixture of carbon monoxide and sulfur dioxide (to produce a reducing mode) or a mixture of carbon dioxide and carbon disulfide (to produce an oxidizing mode). Oxyanions that decompose to produce a nascent oxygen anion, as does the oxalate, are preferred, as they can be reacted to achieve a high conversion rate to the sulfide.

12 Claims, 2 Drawing Sheets

PREPARATION OF METAL SULFIDES

This is a continuation of Ser. No. 111,221, filed Oct. 22, 1987, now abandoned.

BACKGROUND OF THE INVENTION

This invention relates to the preparation of metal sulfides, and, more particularly, to the preparation of high purity sulfides and doped sulfides suitable for luminescense applications.

Luminescence occurs when certain materials are exposed to light or other energy, termed photoluminescence, or excited with an applied electric field, termed electroluminescence. Luminescence is widely used in a variety of commercial and scientific applications. For example, conventional television screens and cathode ray tubes are coated with photoluminescent phosphors which produce light when irradiated with electrons directed against the back side of the screen by the electron gun of the picture tube. Luminescent materials and devices also have application in detectors, instruments, and displays, among other things.

Not all materials can produce luminescence, and the identification and development of improved luminescent materials is ongoing. The most widely used luminescent materials to date have been rare earth oxysulfides doped with other rare earth elements. As an example, $Y_2O_2S$ doped with less than one percent of europium is widely used as the red light emitting phosphor in television tubes. As in most luminescent materials, there is a host material in which is dopant species resides. The dopant actually undergoes the electronic transitions that produce light, but the character of the host is important in creating an environment for the luminescing species so that luminescence can occur and not be quenched by impurities.

Other classes of materials are under consideration for their luminescence, such as metal sulfides doped with metallic or rare earth cations. These materials have the advantage that they can be excited or driven to higher light outputs than doped rare earth oxysulfides, with high light output efficiency and without a breakdown of the material. Additionally, metal sulfides are less expensive than rare-earth-based hosts.

The key to the effectiveness of any luminescent material or device is its ability to produce a high light output under a particular level of excitation, its efficiency, and to be driven to high light output without degradation of the material. A principal obstacle to reaching these goals is the presence of certain types of impurities in the host lattice. Specifically, hydrogen-containing impurities in the lattice of doped metal sulfides have inhibited their widespread use in many applications, because the impurities interfere with the production of light by the dopant and reduce the threshold of radiation damage of the material. Consequently, this class of luminescent materials has not been widely exploited in devices for which it is otherwise ideal, in spite of its potential advantages.

There are a number of techniques now used for producing metal sulfides and doped metal sulfides commercially. In one method, sulfur is boiled in a thick aqueous suspension of calcium hydroxide. A metal sulfide is precipitated, but the ratio of metal to sulfide ions varies widely from batch to batch, and is not readily controlled. Moreover, hydroxide ions are inherently present to contaminate the solid. In another method, solid state conversion of metal sulfates is accomplished with reduction by carbon. This approach is used to prepare metal sulfides for industrial applications where high purity is not required, such as insecticides and depilatories. The resulting impurity content of the resulting metal sulfide is simply too high for its use in luminescence.

In another process, the metal oxide is fused with sodium carbonate in the presence of an excess of sulfur. The metal sulfide is precipitated, with evolution of sulfur dioxide. The free energy of the reaction is positive, but the reaction can be coaxed along by continuously removing the products. This process does not avoid the hydrogen-containing impurities, as oxide in the reaction and carbonate present in the flux can react with any available moisture to produce hydroxide.

The potentially most satisfactory of the prior methods for producing metal sulfides is the conversion of metal chlorides or oxides with hydrogen sulfide or ammonium sulfide. Different variations of this approach are used, some in aqueous solution and others at elevated temperature with the chloride or oxide in the solid state. When accomplished in aqueous solution, there is an inevitable contamination of the metal sulfide with hydrogen in the form of incorporated hydroxide and bisulfide ions. Each solid state reaction has a positive free energy change, and elevated temperature or removal of products are used to encourage the reaction. However, the product remains contaminated with a level of the chloride or oxide, due to the incomplete reaction. In turn, due to the ubiquitous presence of water vapor these impurities form the hydroxide ions that remain to contaminate the metal sulfide.

To summarize, there has been publicly proposed no alternate approach for producing metal sulfides and doped metal sulfides of suitably high purity for use in luminescence applications, although several supplier companies apparently utilize proprietary processing. As a result, this potentially attractive class of luminescent materials has not been exploited. There therefore exists a need for a process for economically and commercially preparing metal sulfides and doped metal sulfides of sufficiently high purity for use in luminescence. Any such process should specifically result in low oxygen and hydroxide contamination of the sulfide. The present invention fulfills this need, and further provides related advantages.

SUMMARY OF THE INVENTION

The present invention provides a method of preparing metal sulfides and doped metal sulfides having a low content of hydroxide and other damaging impurities. The resulting purified sulfides can be used directly as luminescent materials, without further purification, in both photoluminescent and electroluminescent applications. The process can be applied with the sulfide remaining in the solid state, so that handling is simplified and relatively conventional apparatus can be used. Formation of the sulfide is quantitative and economical.

In accordance with the invention, a process for preparing a metal sulfide comprises the steps of furnishing a starting compound of the metal cation with an anion containing oxygen, and heating the starting compound in the presence of a source of carbonyl sulfide, whereupon the starting compound is converted to a metal sulfide.

Using carbonyl sulfide, COS, the reaction with the oxide anion is direct and without intermediaries. Significantly, hydrogen impurity in the sulfide product is avoided, as the carbonyl sulfide reacts with water to produce gaseous carbon dioxide and hydrogen sulfide, which are removed in the gas stream. The resulting metal sulfide is free of the principal contaminant that limited its use in luminescence applications, when prepared by prior methods.

Carbonyl sulfide is an expensive, poisonous gas, when obtained in that form, and can be furnished by a combination of inexpensive gases that react together at elevated temperature to produce carbonyl sulfide. Moreover, the use of a combination of gases permits the preparation of the metal sulfide to be conducted either in a reducing mode or an oxidizing mode. To provide a reducing mode, the carbonyl sulfide is furnished by reacting together carbon monoxide and sulfur dioxide, preferably in a mole ratio of about 10 moles carbon monoxide to 1 mole sulfur dioxide. To provide an oxidizing mode, the carbonyl sulfide is furnished by reacting together carbon dioxide and carbon disulfide, preferably in a mole ratio of about 4 moles carbon dioxide to 1 part carbon disulfide.

The preferred oxygen-containing anion is an oxalate, as oxalates can be readily doped so that the dopant is carried into and incorporated into the metal sulfide. Other oxygen-containing anions, such as hydroxide, nitrate, sulfate and carbonate can also be used.

Accordingly, in a preferred aspect of the invention, a process for preparing a metal sulfide, comprises the steps of furnishing a starting compound consisting of the metal cation with an oxalate anion, and heating the starting compound in the presence of a gas selected from the group consisting of carbonyl sulfide, a mixture of carbon monoxide and sulfur dioxide, and a mixture of carbon dioxide and carbon disulfide.

Another feature of oxygen-containing anions is that, under proper reaction conditions, they can be decomposed to produce the oxide anion in a nascent or highly active state. When in the nascent state, the oxide is more highly reactive than is an oxide furnished as a starting material, leading to a faster and more complete conversion to the sulfide. A procedure has been developed for achieving nascent state processing to the sulfide of the oxygen-containing anion, for the metal oxalates. As previously noted, oxalates are otherwise preferred because they can be readily doped with desirable dopants prior to the conversion reaction, so that the resulting sulfides have the desired dopants and dopant levels.

In accordance with this aspect of the invention, a process for preparing a metal sulfide comprises the steps of furnishing the oxalate of the metal cation as a starting material, heating the metal oxalate in an oxygen-containing atmosphere to form a nascent metal carbonate, and heating the metal carbonate in an atmosphere having a source of carbonyl sulfide to a temperature whereat the metal carbonate decomposes to a nascent metal oxide, whereupon the nascent metal oxide reacts with the carbonyl sulfide to produce the metal sulfide, the step of heating the metal carbonate to continuously follow the step of heating the metal oxalate.

This most preferred processing operation is accomplished by heating the metal oxalate or doped metal oxalate in oxygen to a temperature sufficient to convert the oxalate to a carbonate, with the evolution of carbon monoxide. This reaction is typically accomplished at a temperature of about 500° C. The oxygen atmosphere is replaced with a gaseous source of carbonyl sulfide by discontinuing the oxygen flow, flowing nitrogen to purge the system of oxygen, and then introducing the source of carbonyl sulfide. Preferably, the source of carbonyl sulfide is a mixture of carbon monoxide and sulfur dioxide, or a mixture of carbon dioxide and carbon disulfide, as discussed previously.

The metal carbonate is further heated in the source of carbonyl sulfide to a temperature whereat the carbonate decomposes to the oxide and carbon dioxide gas. The oxide is a highly reactive nascent oxide, which in turn reacts with the carbonyl sulfide to produce the metal sulfide. The decomposition of the carbonate typically begins at 600-700° C., although this temperature can vary depending upon the cation. The optimal reaction temperature for the decomposition of the carbonate in the source of carbonyl sulfide is the temperature at which the rate of the decomposition of the carbonate to the oxide is about equal to the rate of reaction of the oxide with the carbonyl sulfide to produce the metal sulfide. This temperature is, for example, about 720° C. for a starting material of calcium oxalate and about 900° for a starting material of strontium oxalate. The optimal temperature can be determined by established analytical techniques, to be described subsequently.

A variety of metal sulfides can be prepared by the techniques described herein, including, for example, cadmium, strontium, zinc, and calcium sulfides. The resulting sulfides are of high purity, and particularly have the low hydrogen and oxygen impurity levels that are suitable for preparing luminescent materials. The sulfides can be doped either after preparation, or, most conveniently, during preparation by doping the oxygen-containing anion prior to formation of the sulfide. The dopant is then carried into the sulfide. Dopants include, for example, rare earth elements, silver, manganese, and copper.

It will be appreciated that the present approach provides a convenient, solid state method for preparing metal sulfides and doped metal sulfides of sufficiently low impurity content to be used in luminescence applications. The method is safe to use, economical, and operable with readily available laboratory or commercial purification apparatus. Other features and advantages of the invention will be apparent from the following more detailed description of the invention, taken in conjunction with the accompanying drawings, which illustrate, by way of example, the principles of the invention.

DETAILED DESCRIPTION OF THE PREFERRED EMBODIMENT

Figure 1:
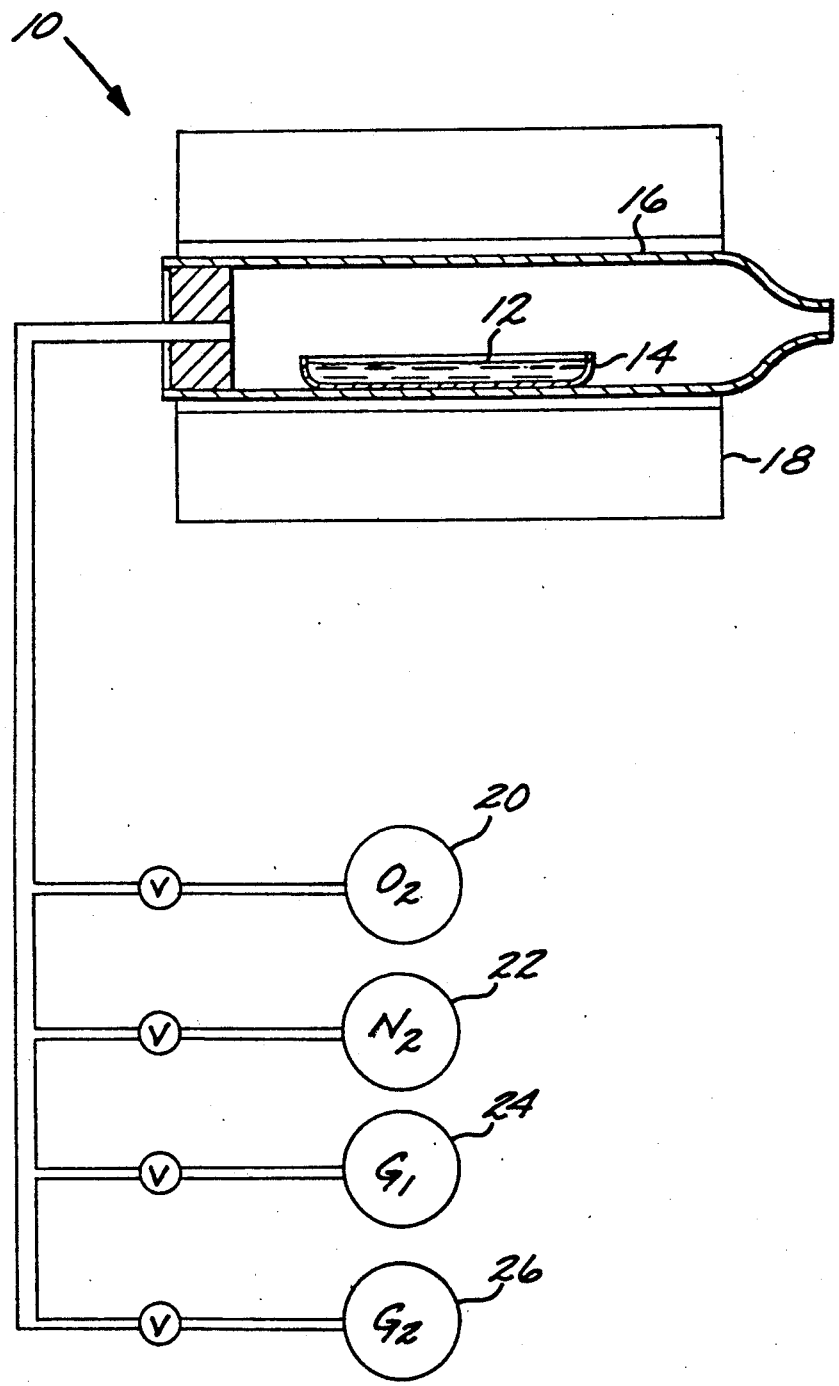
FIG. 1 is an apparatus for accomplishing the preparation of a metal sulfide.

In the preferred embodiment, an undoped or doped metal oxalate is converted to the corresponding undoped or doped metal sulfide in a flowing gaseous apparatus 10 of conventional design. The metal oxalate is preferably furnished in a finely divided form such as a powder 12 of 600 mesh. The use of the finely divided form reduces the diffusion distances for complete reaction with a gaseous phase, reducing the reaction time to produce the sulfide.

The finely divided metal oxalate powder 12 is placed into a suitable reaction boat 14 made of fused silica. The boat 14 is placed into a reaction tube 16 made of fused silica. The reaction tube 16 is surrounded by a furnace 18 capable of heating the tube 16, boat 14, and oxalate powder 12 to a sufficiently high temperature to accomplish the reactions, typically 1000° C. or less. A gas flow of oxygen is initiated in the reaction tube 16 from an oxygen source 20, and the furnace 18 is turned on to heat the apparatus 10.

The oxalate is heated in the oxygen atmosphere to a temperature at which the oxalate decomposes to the carbonate plus carbon monoxide. The carbon monoxide is evolved and removed with the flowing oxygen stream. The decomposition temperature may depend upon the particular oxalate being processed, but has been found to be about 500° C. for the processing of calcium oxalate and strontium oxalate.

When the conversion of the oxalate to the carbonate is completed, typically about 0.5 hours for about 0.2 moles of oxalate, the oxygen gas flow is discontinued and replaced by a nitrogen gas flow from a nitrogen source 22, to purge the system of oxygen. The nitrogen gas flow is continued for about 20 minutes.

After the system is purged completely of oxygen, a flowing source of carbonyl sulfide is introduced. The source can be carbonyl sulfide itself, although the pure compound is expensive to purchase and does not permit the process control possible when a mixture of gases is used to produce the carbonyl sulfide. Preferably, the source of the carbonyl sulfide is a mixture of carbon monoxide and sulfur dioxide, most preferably in a mole ratio of about 10 moles CO to 1 mole $SO_2$, if a reducing mode is needed. Alternatively, the source of the carbonyl sulfide is a mixture of carbon dioxide and carbon disulfide, most preferably in a mole ratio of about 4 moles $CO_2$ to 1 mole $CS_2$, if an oxidizing mode is needed. These gases used in the two mixtures are relatively inexpensive, and are furnished in appropriate sources 24 and 26, that are provided separately and simultaneously flowed into the tube 16. Both of these mixtures of gases react at the elevated temperature within the furnace 18 to produce carbonyl sulfide, COS, but the associated conditions can vary. The results of using these alternative mixtures will be discussed in more detail in relation to the examples.

After the gaseous flow of the source of carbonyl sulfide is established, the temperature of the reaction tube, boat, and metal carbonate is increased so that the carbonate decomposes to nascent oxide ions and carbon dioxide gas, according to the relation

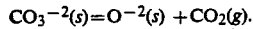

$$CO_3^{-2}(s) = O^{-2}(s) + CO_2(g).$$

The carbon dioxide is evolved and removed in the flowing gas stream. The temperature at which this decomposition reaction begins, upon heating, is typically about 600–700° C.

The nascent oxide ions are highly reactive, and react with the carbonyl sulfide to produce the sulfide and carbon dioxide, according to the reaction:

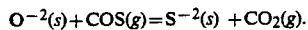

$$O^{-2}(s) + COS(g) = S^{-2}(s) + CO_2(g).$$

The carbon dioxide is evolved and carried away in the flowing gas stream.

The reactions are conducted by continuously heating the powder from the temperature of the first reaction to the temperature of the second reaction. As used herein, "continuous" does not require that the temperature be continuously increased, as there can be and usually are pauses for purging the system with nitrogen. However, the nascent state of the oxide may be lost if the compound containing the nascent oxide produced by carbonate decomposition is cooled to a low temperature or exposed to contaminants. "Continuous" is therefore used to mean that no process interruption is permitted that would interfere with the maintenance of the nascent state of the oxide ions.

The sulfide anion remains in the solid state with the metallic cation, which is unaffected by the various reactions. Dopants present in small quantities in the oxalate, if any, are also unaffected by the reactions and are carried through to the final metal sulfide.

The use of the carbonyl sulfide provides an important benefit not obtainable with prior sources of the sulfide. Hydrogen and oxygen present as contaminants, as in the form of water vapor, react with the excess carbonyl sulfide, to produce carbon dioxide and hydrogen sulfide, both of which are gases that are carried away in the flowing gas stream. That is, the hydrogen and oxygen impurities are reacted and carried away, so that they cannot contaminate the final metal sulfide.

The most preferred temperature for the reaction of the nascent oxide and the carbonyl sulfide, according to the second equation, is the temperature at which the rate of this reaction is about equal to the rate of decomposition of the carbonate to the nascent oxide, according to the first reaction. The value of this temperature depends upon the cation being used, and is as indicated for the following preferred cases: calcium sulfide, 720° C., strontium sulfide, 900° C.

Figure 2:
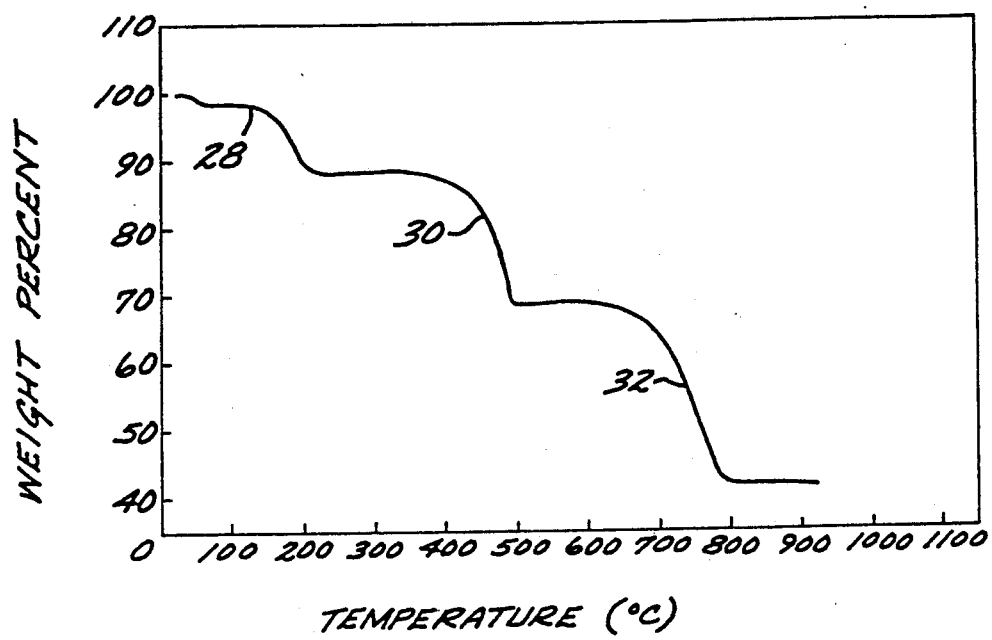
FIG. 2 is an illustrative TGA thermogram illustrating the various stages of heating.

The preferred temperature can be determined from a TGA thermogram for any particular starting material, an example of which is presented in FIG. 2 for conversion of calcium oxalate to calcium oxide. The calcium oxalate is provided in a hydrated form, $CaC_2O_4 \cdot H_2O$. The water of hydration is lost during the first portion 28 of the heating curve, extending to a temperature of about 200° C. The oxalate is stable from about 200° C. to about 400° C., and becomes unstable to form carbonate with the evolution of carbon monoxide from about 400° C. to about 500° C., in the second portion 30. The carbonate decomposes to the nascent oxide, with the loss of carbon dioxide, in the third portion 32, extending from about 650° C. to about 780° C. The oxide is nascent in this range, being of lower concentration and greater reactivity toward the low end of the range and of higher concentration but lesser reactivity toward the high end of the range. The optimal operating temperature is chosen to be slightly higher than the knee of the curve in the third portion 32, at about 720° C. For other starting materials involving intermediate production of a nascent anion whose presence aids in achieving a rapid conversion and is therefore desirable, the temperatures for the conversion steps upon heating can be determined similarly.

The following examples are intended to illustrate aspects of the invention, and should not be taken as limiting the invention in any respect.

EXAMPLE 1

Undoped calcium sulfide was prepared from calcium oxalate in the apparatus and with the processing previously described in relation to FIG. 1. The decomposition of the oxalate to the carbonate according to the first equation is accomplished in flowing oxygen at about 500° C. The decomposition of the carbonate to the nascent oxide in a source of carbonyl sulfide is accomplished at about 720° C., as established by the technique of FIG. 2. The source of carbonyl sulfide was a mixture having a mole ratio of 10 moles carbon monoxide to 1 part sulfur dioxide. The resulting calcium sulfide was a powder having the same general appearance as the calcium oxalate starting material. Complete conversion of 20 grams of calcium oxalate to calcium sulfide required about 12 hours. An X-ray diffraction pattern was taken to verify the presence of calcium sulfide with a 1:1 atomic ratio of the calcium and the sulfur atoms.

EXAMPLE 2

Example 1 was repeated, except that strontium sulfide was produced from strontium oxalate. The operating conditions were the same as in Example 1, and the results were the same, except that the temperature of the reaction of the nascent oxide to the sulfide was selected to be 900° C. This selection was made based upon a TGA thermogram of strontium oxalate, similar to that of FIG. 2.

EXAMPLE 3

Impure zinc sulfide, doped with silver, was prepared by reacting an aqueous solution of zinc chloride having silver ions therein, with ammonium sulfide, to precipitate zinc sulfide doped with silver. The precipitate was washed with methyl alcohol. The precipitate, while being primarily zinc sulfide doped with silver, also had a substantial impurity level.

The impure zinc sulfide doped with silver was processed in CO and $SO_2$ as in Example 1, to produce a purified zinc sulfide doped with silver.

EXAMPLE 4

Example 3 was repeated, except that the zinc sulfide doped with 0.2 atomic percent silver was purified in an oxidizing mode from the impure zinc sulfide doped with silver. The oxidizing mode was achieved by using, a source of carbonyl sulfide, a gaseous mixture having molar ratios of 4 moles of carbon dioxide to 1 mole of carbon disulfide.

Examples 3 and 4 demonstrate that the process of the invention can be used to prepare doped sulfides, and also can be used with the impure sulfide as the starting material.

EXAMPLE 5

Figure 3:
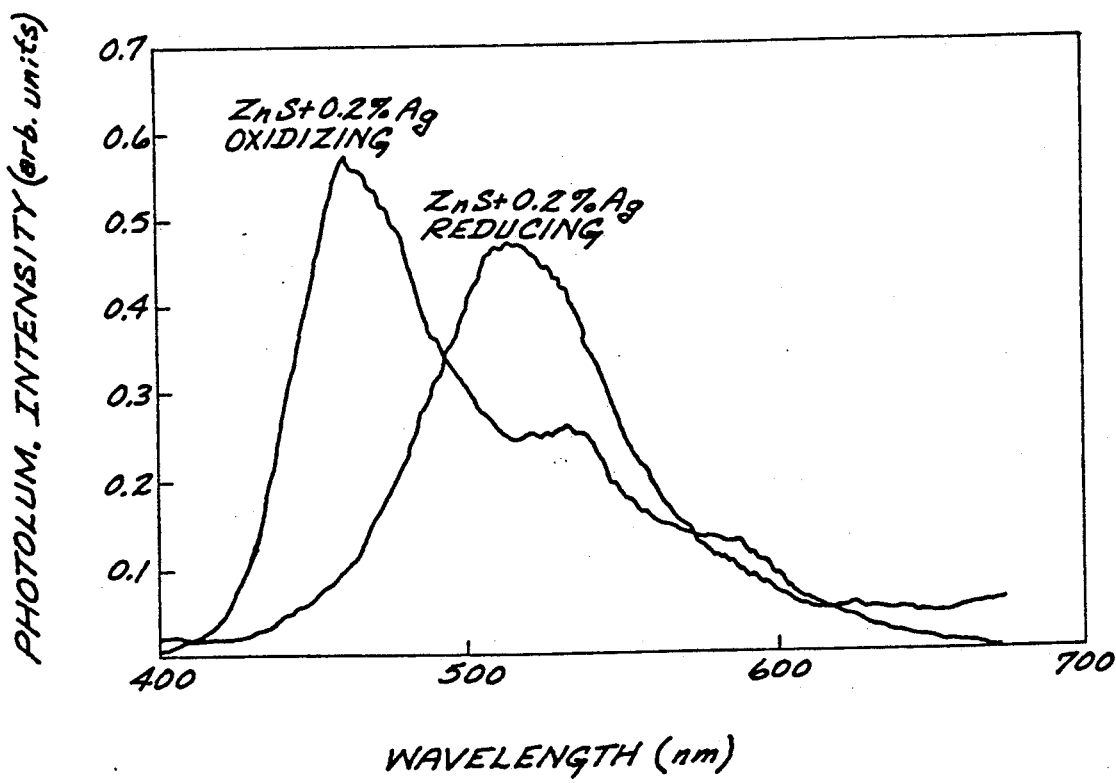
FIG. 3 is a photoluminescence spectrum of two doped sulfides.

The doped zinc sulfides of Examples 3 and 4 were measured to obtain their luminescence spectra, when excited by a mercury-arc lamp. The spectra are shown in FIG. 3. The material produced under oxidizing conditions, Example 4, has a major peak in the blue light range. The material produced under reducing conditions, Example 3, has a peak in the green light range. The peak luminescence can therefore be influenced by the source of the carbonyl sulfide.

Thus, the present invention provides a method for producing high purity metal sulfides and doped metal sulfides suitable for use in luminescence applications. Although particular embodiments of the invention have been described in detail for purposes of illustration, various modifications may be made without departing form the spirit and scope of the invention. Accordingly, the invention is not to be limited except as by the appended claims.

What is claimed is:

1. A process for preparing a metal sulfide comprising the steps of:

furnishing an anhydrous starting compound containing the metal cation and having an anion containing oxygen that is selected from the group consisting of a nitrate, an oxalate, a sulfate, and a carbonate; and heating the starting compound in the presence of a source of carbonyl sulfide selected from the group consisting of dry carbonyl sulfide free of hydrogen and hydroxyl ion, a mixture of carbon monoxide and sulfur dioxide, and a mixture of carbon dioxide and carbon disulfide, said mixture (a) containing reactants that are dry and free of hydrogen and hydroxyl ion and (b) reacted at a temperature sufficient to produce said carbonyl sulfide, whereupon the starting compound is converted to a metal sulfide in a dry environment free of hydrogen and hydroxyl ion.

2. The process of claim 1, wherein the source of the carbonyl sulfide is a mixture of carbon monoxide and sulfur dioxide, and the mole ratio of the mixture is about 10 parts carbon monoxide for 1 part sulfur dioxide.

3. The process of claim 1, wherein the source of the carbonyl sulfide is a mixture of carbon dioxide and carbon disulfide, and the mole ratio of the mixture is about 4 parts carbon dioxide for 1 part carbon disulfide 4. The process of claim 1, wherein the metal cation is selected from the group consisting of strontium, cadmium, zinc and calcium.

5. A process for preparing a metal sulfide comprising the steps of:

furnishing an anhydrous starting compound containing the metal cation with an oxalate anion; and heating the starting compound in the presence of a gas selected from the group consisting of dry carbonyl sulfide free of hydrogen and hydroxyl ion, a mixture of carbon monoxide and sulfur dioxide, and a mixture of carbon dioxide and carbon disulfide, said mixture (a) containing reactants that are dry and free of hydrogen and hydroxyl ion and (b) reacted at a temperature sufficient to produce said carbonyl sulfide, whereupon the starting compound is converted to a metal sulfide in a dry environment free of hydrogen and hydroxyl ion.

6. The process of claim 5, wherein the metal cation is selected from the group consisting of strontium, cadmium, zinc, and calcium.

7. A process for preparing a metal sulfide, comprising the steps of:

furnishing an oxalate of the metal cation as a starting material;

heating the metal oxalate in an oxygen containing atmosphere to form an anhydrous nascent metal carbonate; and heating the metal carbonate in an atmosphere having a source of dry carbonyl sulfide free of hydrogen and hydroxyl ion to a temperature whereat the metal carbonate decomposes to a nascent metal oxide, whereupon the nascent metal oxide reacts with the carbonyl sulfide to produce the metal sulfide, said step of heating the metal carbonate to continuously follow said step of heating the metal oxalate, such reaction occurring in a dry environment free of hydrogen and hydroxyl ion.

8. The process of claim 7, wherein the metal oxalate is doped with at least one dopant element selected from the group consisting of a rare earth, silver, manganese, and copper.

9. The process of claim 7, wherein the metal is selected from the group consisting of strontium, calcium, cadmium, and zinc.

10. The process of claim 7, wherein the starting material is calcium oxalate, and the temperature in said step of heating the metal carbonate is about 720° C.

11. The process of claim 7, wherein the starting material is strontium oxalate, and the temperature in said step of heating the metal carbonate is about 900° C.

12. The process of claim 1, wherein the starting compound is doped with at least one dopant element selected from the group consisting of a rare earth element, silver, manganese, and copper.

* * * * *